Nov. 21, 1967  A. G. FISHER  3,353,618
ARTICULATED VEHICLE

Filed Sept. 27, 1965  4 Sheets-Sheet 1

INVENTOR.
ALFRED G. FISHER
BY: *Church & Rogers*
PATENT AGENT

Nov. 21, 1967  A. G. FISHER  3,353,618
ARTICULATED VEHICLE

Filed Sept. 27, 1965  4 Sheets-Sheet 2

INVENTOR.
ALFRED G. FISHER
BY~ Church & Rogers
PATENT AGENT

INVENTOR.
ALFRED G. FISHER

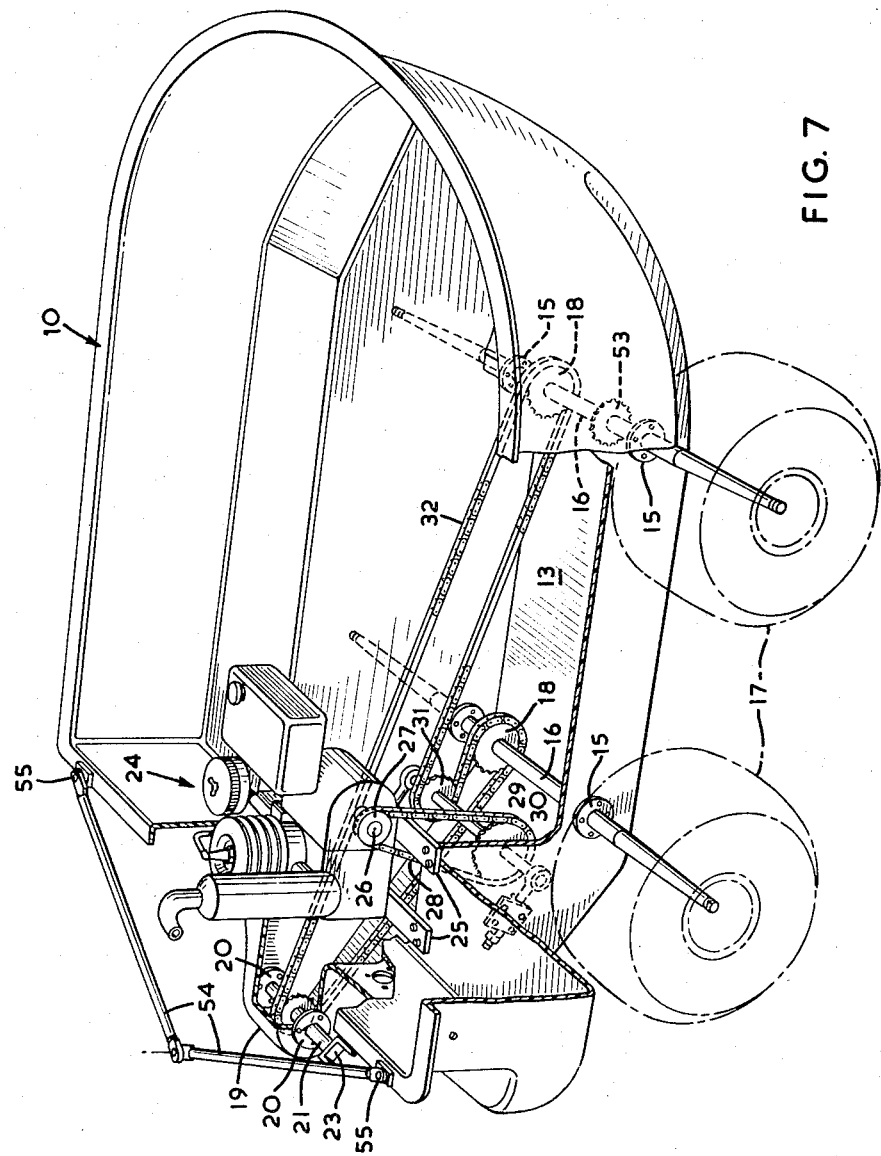

United States Patent Office 3,353,618
Patented Nov. 21, 1967

3,353,618
ARTICULATED VEHICLE
Alfred Gordon Fisher, 1152 Linbrook Road,
Oakville, Ontario, Canada
Filed Sept. 27, 1965, Ser. No. 490,312
8 Claims. (Cl. 180—14)

ABSTRACT OF THE DISCLOSURE

An all-terrain vehicle comprises two similar four-wheeled or two-tracked vehicle bodies, the bodies being articulately connected about all three mutually perpendicular axes by a universal joint disposed between two parallel-extending projecting portions of the bodies with its principal rotational axis transverse to the vehicle direction of movement; a motor in one body chain-drives the wheels of its own body and the universal joint, and the latter transmits the drive between the bodies, the wheels of the other body being chain-driven from the joint; for the small vehicle illustrated steering is obtained by a linkage between the two bodies forcing them to pivot about a vertical axis passing through the universal joint.

---

This invention relates to improvements in articulated vehicles of the type comprising at least two vehicle units so articulated together that they can pivot, pitch and roll relative to one another.

In the type of articulated vehicle intended for use on hard, smooth-surfaced roads, such as tractor-trailer combinations, two units are freely pivotally connected to one another about a vertical axis, but the range of pitch about a horizontal axis perpendicular to the direction of travel and the range of roll about a horizontal axis parallel to the direction of travel are relatively limited. In articulated vehicles of the type intended for use on difficult terrains, and in traversing water, snow or soft ground, as many as possible of the ground-engaging members on which the vehicle travels should be driven, and greater ranges of pitch and roll must be permitted by the articulated connection, so that the vehicle can conform as closely as possible to the terrain over which it is moving, and maintain as many as possible of the said ground-engaging members in driving engagement with the terrain. Since economy and ease of operation usually dictate the use of a single driving motor, a drive connection must be provided between the two vehicle units that will transmit power from the motor in one of the units to the ground-engaging members in the other unit.

It is an object of the present invention to provide a new articulated vehicle.

It is another object to provide a new articulated vehicle in which a single universal joint provides an articulating connection and/or a drive connection between two directly connected articulated vehicle units.

In accordance with the present invention there is provided an articulated vehicle comprising at least two vehicle units, a driving motor mounted in one unit, and a driving connection and/or an articulating connection between the two units to drive the other unit from the said motor, the said connection comprising a universal joint rotatable about an axis generally perpendicular to the direction of travel of the vehicle. Preferably, the said universal joint comprises both a driving and an articulating connection between the first two vehicle units.

Figure 1:
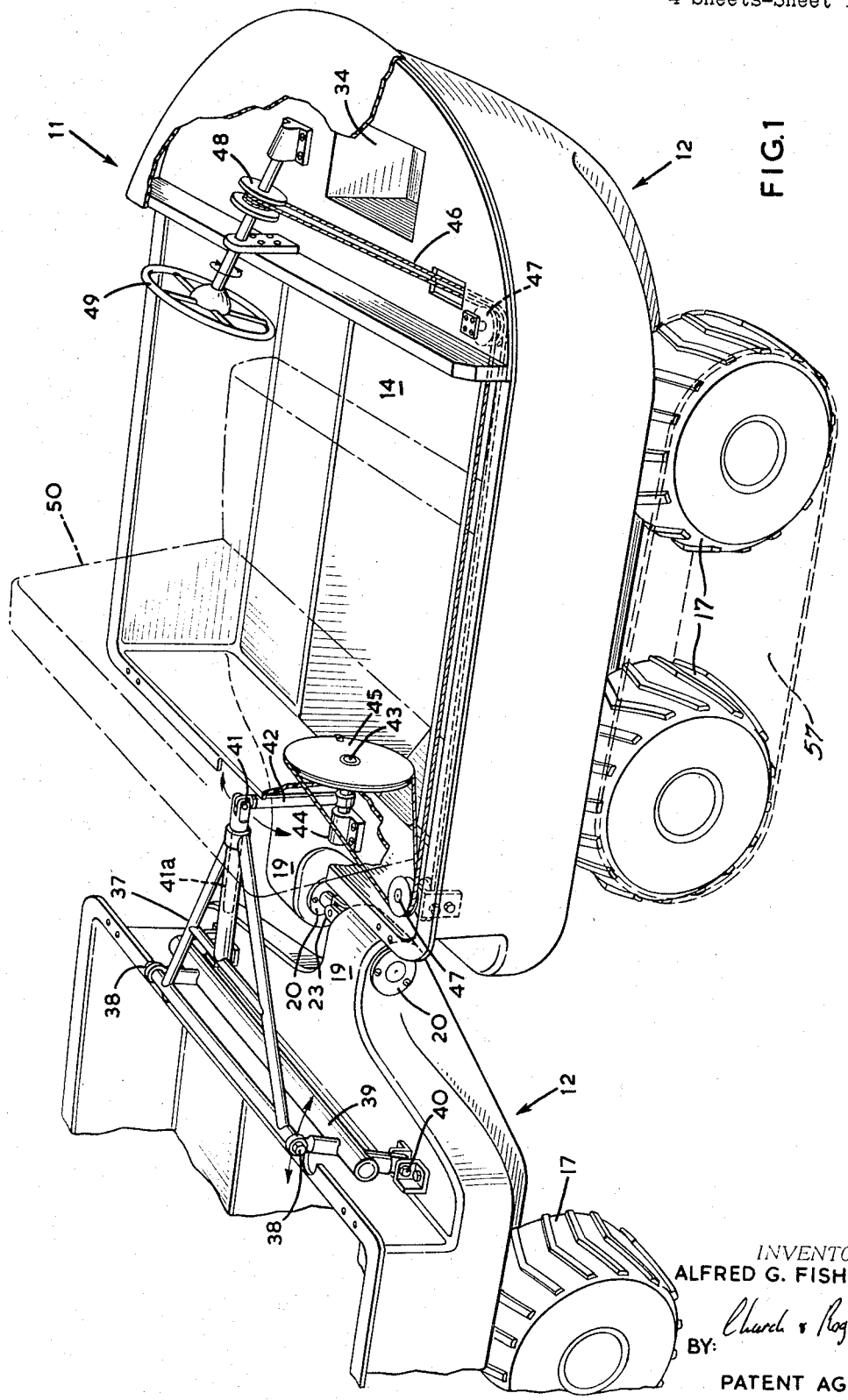
Figure 2:
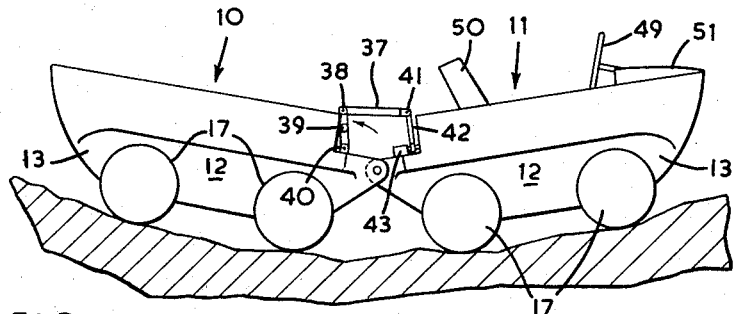
Figure 3:
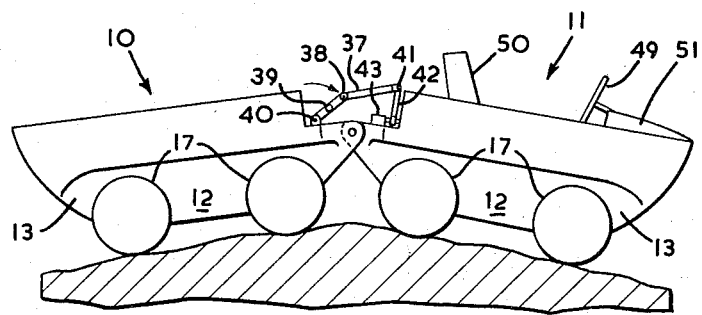
Figure 4:
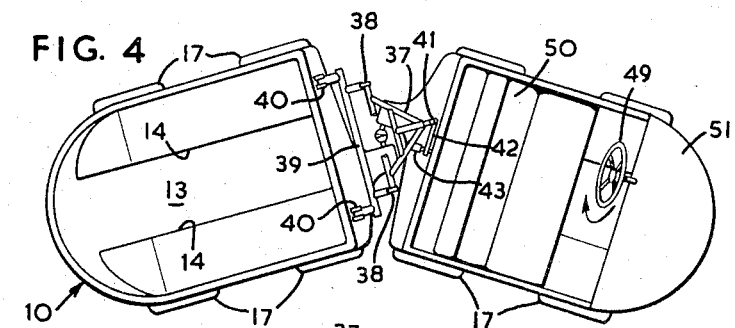
Figure 5:
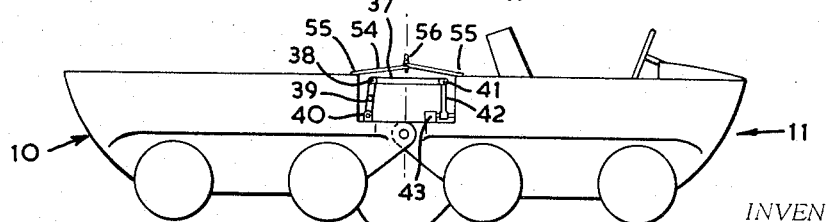
Figure 6:
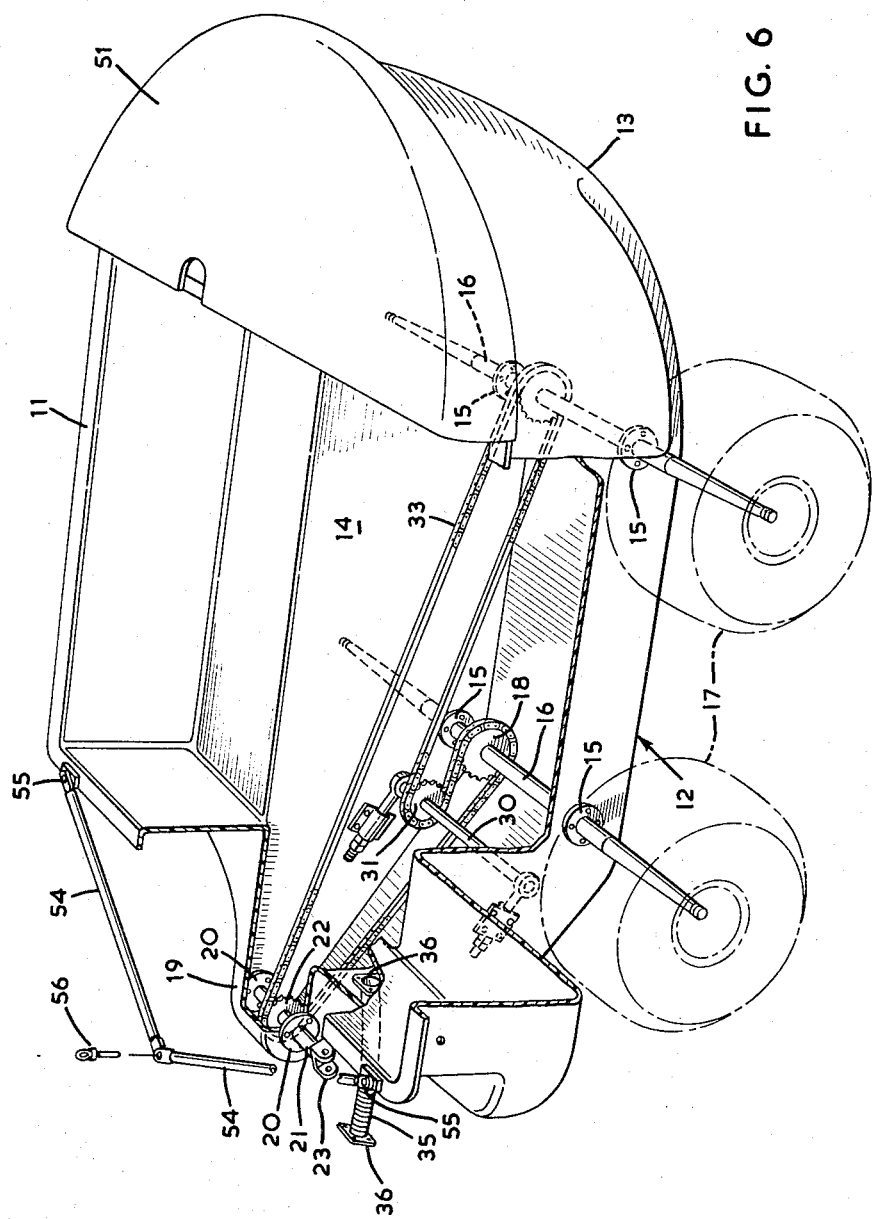

Particular preferred embodiments of the invention will now be described, by way of example, with reference to the accompanying drawings wherein:

FIG. 1 is a perspective view of the front unit and part of the rear unit of a two-unit articulated vehicle in accordance with the invention, the figure being intended to show particularly the steering arrangement for the vehicle and the driving means therefore being omitted, FIGS. 2 and 3 are schematic side elevations to show the manner in which the vehicle traverses respectively a dipped and humped terrain, FIG. 4 is a schematic plan view from above, FIG. 5 is a schematic side elevation to illustrate the arrangement of an additional connection between the two vehicles for use in certain types of terrain, and FIGS. 6 and 7 are views similar to FIG. 1 of the respective vehicle units to show particularly the drive constructions therein and the said additional connection, the steering mechanism therefore being omitted.

In all the figures of the drawings similar parts are given the same reference and parts thereof are broken away for clarity of illustration.

Referring now especially to FIGS. 1 to 6, the particular articulated wheeled vehicle illustrated therein comprises first and second similar vehicle units 10 and 11, respectively, connected end-to-end with the first unit 10 normally constituting the front unit. For convenience in description and definition in the appended claims references to planes, axes of rotation, etc., will always be made as if the vehicle were standing on a level surface with the two units thereof directly one behind the other, and the axes of rotation of all the wheels parallel to one another.

This particular vehicle is of relatively small size such as might be used, for example, by from one to four persons on a hunting trip, each of the units being capable of carrying two adults seated side by side, or an equivalent amount of luggage, supplies, etc. The capacity of each vehicle unit can of course be made larger or smaller as desired by suitable choice of the size, shape etc. of the unit, and it is also contemplated that toy or child's vehicles in accordance with the invention are within the scope of the appended claims. The load carrying capacity of the whole vehicle can also be increased by use of more than two vehicle units to form an articulated vehicle train, such an arrangement being described in more detail below.

Each vehicle unit comprises a smoothly-contoured, generally boat-shaped body that is somewhat elongated in the intended direction of travel of the vehicle. The shape of the bodies is such that the vehicle can operate in water of depth such that it is completely floating, and will be stable and readily controllable under such conditions. The two bodies are of exactly similar shape turned end-for-end, and, for example, if they are produced by a moulding process using glass fibre and a suitable resin, the same mould can be used for the production of both bodies.

Each body has two relatively wide side recesses 12, formed in the lower portion thereof, and providing between themselves a relatively deep well portion 13 having vertical side walls 14. Two pairs of water-proof, transversely spaced bearings 15 (FIGS. 6 and 7) are mounted on the side walls 14 near to the bottom of the well, each pair serving to mount in the vehicle a respective wheel and axle assembly. Each such assembly comprises a hollow tubular axle 16 mounted in the respective bearing 15 for free rotation about a corresponding axis of rotation, which is perpendicular to the general longitudinal axis of the vehicle, and thus to the general direction of travel of the vehicle. The two ends of each axle project beyond the bearings into the said recesses 12 and carry respective relatively small diameter, low-pressure balloon wheels 17, such as those particularly described and claimed in my patent Ser. No. 3,237,675, such wheels being particularly suitable for a vehicle intended for travel on difficult terrain. The part of each axle 16 within the central well 13 has an axle chain sprocket 18 mounted coaxially thereon to rotate therewith. The axial width of the side recesses corresponds approximately to the axial width of the tires, so that the upper part of the body is of maximum possible width, while the wheels are accommodated substantially completely beneath the vehicle body.

Each body also comprises a longitudinal extension portion 19 which protrudes from one end and is offset to one side of a longitudinal vertical plane that passes centrally through the unit bodies and thus contains the said general longitudinal axis. When the units are reversed end-for-end relative to one another, as seen in FIGURE 1, etc., the two extensions 19 overlap one another on opposite sides of the said central plane. Each extension has fixed therein a pair of spaced coaxial bearings 20 mounting a respective rotatable shaft member 21 for rotation about an axis perpendicular to the vehicle longitudinal axis and to the said longitudinal vertical plane, so that the axis of rotation of the member 21 is parallel to the axes of rotation of the shafts 16 of the associated wheel and axle assemblies. A chain sprocket 22 is mounted on each shaft member 21 for rotation therewith. The ends of the two members 21 that protrude towards each other, and are thus immediately adjacent one another, are connected together by means of a universal joint 23 having its median axis coaxial with the coaxial axes of rotation of the two members 21 which it connects. This single universal joint 23 constitutes both an articulating connection and a driving connection for the two vehicle units. In operation the universal joint will usually be enclosed by a flexible sleeve (not illustrated) that protects it against the deleterious effects of dirt, moisture, etc.

A single driving motor 24 (FIG. 7) for the vehicle is illustrated herein as being an internal combustion engine mounted in the rear vehicle unit, although it can of course be mounted in either unit, by means of a pair of straps 25 bridging the well 13. The motor is mounted in the unit with the axis of rotation of its power output shaft 26 parallel to the axes of rotation of the unit's wheel and axle assemblies, and parallel to the axis of rotation of the said shaft member 21. A motor chain sprocket 27 is fast with the output shaft 26 for rotation thereby, and is drivably connected by a chain 28 to a sprocket 29 fast with a live shaft 30. The live shaft has another sprocket 31 fast therewith and a single driving chain 32 for the rear unit passes around the sprocket 31, the two axle sprockets 18 and the shaft member sprocket 22, so that all four wheels 17 and the rotatable member 21 are positively driven from the motor. The position of the live shaft 30 is adjustable longitudinally by any suitable means for adjusting the tension of the driving chain 32. A corresponding single driving chain 33 (FIG. 6) for the front unit passes around the shaft member sprocket 22, the two axle sprockets 18, and the sprocket 31 of an associated live shaft chain tension adjusting means, so that all four wheels of the front unit are also positively driven from the motor located in the rear unit. It will be seen therefore that I have provided a simple eight-wheeled vehicle in which all of the wheels are positively driven. Owing to this fact and to the low pressure (e.g., 2-3 pounds per square inch) of the tires and their relatively large area of contact with the ground, the vehicle has excellent traction over all types of difficult terrain, including in particular soft, relatively swampy ground and soft sand.

Because of the particular arrangement of the single universal joint as both the articulating connection and the driving connection between the two units, they have the necessary freedom of movement to pitch about the said median joint axis (see FIGS. 2 and 3) pivot about a vertical axis passing through the joint (see FIG. 4) and roll relative to one another about a horizontal axis passing through the joint within the limits that are principally dictated by the desirability of avoiding impacts and rubbing contacts between immediately adjacent parts of the two bodies. Although this universal joint is subjected to both the driving forces of the vehicle, because of the simplicity and robustness of the manner in which its associated shaft members 21 can be mounted between pairs of spaced securely fastened bearings 20, the joint used can be extremely robust, so that it will readily withstand all of the forces that will usually be applied thereto. From the commercial aspect it will be appreciated that universal joints of a wide variety of sizes and strengths are readily available. It will be noted, moreover, that all other load-bearing members of the vehicle are solidly mounted on or connected to the respective bodies, so that these components also will have the robustness and simplicity desirable in this type of vehicle. It will be seen further that the axles of the wheel and axle assemblies comprise simple tubular members, which can be of considerable strength while being light and inexpensive to manufacture. By application of the present invention it is also possible to provide that all of the members to be driven are mounted in the vehicle with their axes of rotation parallel to one another, permitting the use of a relatively inexpensive and robust chain drive to provide a driving connection from the motor to all of the ground engaging members of the vehicle. Recognizing that the particular vehicle illustrated is intended for use on difficult terrains, the use of a chain drive has a particular practical advantage, in that such drives are relatively trouble free under severe conditions of operation, and are relatively simple to repair or replace.

Although the motor is mounted in the rear unit, the steering and control station for the driver is conventionally located in the front unit. In such a vehicle which is of relatively light weight, it may be desired to locate other heavy fixed components also in the front unit for more even distribution of weight. For example, the relatively heavy battery for operating the engine starter, lights, etc., is in this embodiment mounted in a well 34 provided in the front unit. The engine control cables and electric power wires that must consequently pass between the units are threaded through a flexible protective tube 35 (FIG. 6) clamped at each end to a respective hollow tubular projection 36 from the associated vehicle unit body.

Steering of the vehicle particularly illustrated herein is accomplished by forcing the two vehicle units to pivot relative to one another about a vertical axis generally coincident with the general vertical articulating axis of the universal joint, this being accomplished by steering means to be described in detail. Such a method of steering does result in some sideways skidding of the vehicle wheels, but relatively little tire wear is caused thereby with the small size vehicle particularly illustrated herein, and is more than compensated by the simplicity and robustness of the vehicle as a whole. It is however, contemplated that the broad principles of this invention can also be applied to articulated vehicles in which a more conventional type of steering is employed, e.g., the steering of the front pair of the wheels of the front wheeled vehicle unit, or the braking of the tracks of the front tracked vehicle unit. In particular it is contemplated that a power steering arrangement such as described in my Patent Ser. No. 3,269,218 may be employed for this purpose.

Referring now especially to FIG. 1, the particular steering means of this embodiment comprise a horizontal connecting link member 37 of generally triangular form as seen in plan, which is pivoted at two spaced points 38 about a first transverse axis to a vertical connecting link member 39, which is in turn pivoted at two spaced points 40 to the rear vehicle body about a second transverse axis parallel to and displaced vertically from the first axis, both axes being parallel to the axes of rotation of the vehicle wheels. The arrangement of these pivot points 38 and 40 is such that the connection of the base portion of the triangular link member 37 with the first unit 10 is fixed transversely to the general normal direction of movement of the vehicle. The connection of the other apex end of the link member 37 with the front vehicle unit 11 is by means of a suitable universal joint 41 with an arm 42 that extends radially upwardly from a shaft member 43 mounted in a bearing 44, for rotation about an axis lying generally in the same vertical plane as the longitudinal axis of the vehicle. A disc 45, of sufficiently large diameter to provide the desired steering torque, is fast with the shaft 43, and is rotated as required by means of a cable 46 fastened to the periphery of the disc and passing around pulleys 47 to rotatable sheaves 48 controlled by a steering wheel 49 at the driver's position. The wheel 45, etc., is usually concealed by a seat 50, while the sheaves 48, etc., are usually concealed by a cover 51. Upon rotation of the steering wheel the arm 42 executes a corresponding rotation about its axis, causing the radially outer end of the arm and the joint 41 to execute a simple harmonic motion in the respective transverse direction. Such a steering arrangement has the advantage that it provides in a simple robust manner a variable rate steering mechanism, i.e., it is relatively highly sensitive to movement of the steering wheel in the median position, but is progressively less sensitive, as is desired, as the amount of steering pivoting movement of the arm increases. It will be noted that the steering mechanism is effective at all times to hold the vehicle units in predetermined angular relation to one another, and in particular prevents any "jack-knifing" that might otherwise occur, for example when the vehicle is travelling downhill.

The steering connection accommodates rolling of the two units relative to one another in the manner illustrated by FIG. 5 by means of the universal joint connection 41 between the connecting link member 37 and the arm 42 member, but it will be understood that any other suitable form of connection may also be used to accomplish this end. The steering mechanism must also accommodate the relatively wide range of pitching movement that takes place between the two units, as illustrated by FIGS. 2 and 3, and this is accomplished by the use of two separate link members 37 and 39 pivoted to one another and to the unit 10 respectively about the first and second transverse axes. The two links together form effectively a single connection between the two units that is able to change length as the two units pitch relative to one another without affecting the steering of the vehicle.

In another form of steering connection that is contemplated a single rigid link member pivoted at points 40 replaces the two members 37 and 39, and the longitudinal movement is accommodated by the arm 41a which telescopes within the enclosing tubular member of the link. Other arrangements which permit the necessary longitudinal movement while providing the necessary transverse rigidity will now be apparent to those skilled in the art.

It is also contemplated that other mechanical connections may be employed in the steering mechanism. For example, instead of using an arm rotating about a longitudinal axis to move the connection 41, a suitable nut member to which the connection is pivoted may be mounted on the rear of the unit 11 for linear transverse movement under control of the cable 46 and steering wheel 49, the variable rate steering, if desired, being accomplished by use of a variable diameter pulley sheave. In another arrangement the cable is eliminated and the nut member is mounted upon a screw threaded rod, which is mounted on the front unit in two transversely spaced bearings with its axis of rotation transverse to the longitudinal axis of the vehicle. A reversible electrical or hydraulic motor is connected to one end of the rod, or two unidirectional motors are connected to respective ends thereof, so that the rod can be rotated in opposite directions. With such an arrangement steering is readily accomplished by operating the motor to rotate the rod in the required direction and thereby move the connection in the required direction. In a further arrangement the connection is moved by a double-acting hydraulic extensible strut, or by two opposed single-acting struts.

As described above, it is possible to use more than two units to form an articulated vehicle train that is in accordance with the invention. In such an arrangement the two endmost units can be of similar shape turned end to end, and each intermediate unit will require to be of different shape from the end units, although all of the intermediate units can be of the same shape. Each immediately adjacent pair of units are articulated together and drivably connected together by means of a respective single universal joint, so that power can be readily transmitted from a single motor to all of the units of the vehicle and all of the ground engaging members of the units can therefore be driven. In such an arrangement the steering of the vehicle will normally be accomplished by pivoting the frontmost unit relative to the remainder of the train, the succeeding pairs of units being connected to one another by shock-absorbing means (such as telescopic struts) which will permit the usual rolling and pitching of the units relative to one another, but which will constrain the two units against relative pivoting motion about the vertical pivot axis of greater than a predetermined extent, and will apply substantial restoring forces tending to maintain the units in desired alignment one behind the other.

When the vehicle is completely floating in the water a heavy tread on the wheels 17 will provide some propulsive force, but in some embodiments a water jet propulsion unit (not shown) of conventional form may be mounted at the rear of the rear unit, and driven as required from the immediately adjacent axle 16, via sprocket 53 and a connecting chain (not shown). Alternatively a bracket may be provided at the rear of the rear unit for mounting an outboard motor, the motor being fixed in position and steering being effected by steering the vehicle in the same manner as if on land.

With some types of terrain, such as relatively open water, muskeg that is full of small potholes and some snow conditions, it may be found desirable to increase the rigidity of the vehicle against pitching and perhaps also rolling, while maintaining its freedom to pivot, by means of an additional pivot connection spaced vertically from the primary connection, as shown in FIG. 5. Referring also to FIGS. 6 and 7, this additional connection comprises a pair of struts 54 for each body, each pivoted at one end to the body at 55, and all connected together at their free ends by a vertical connecting pin 56, whose longitudinal vertical axis is coincident with the vertical pivoting axis of the primary connection 23. With the pin in operative position the units can pivot freely about the vertical axis, but their freedom to pitch and roll is relatively restricted. When the additional connection is not required the pin 56 is removed and the struts folded back out of the way, along the edges of the units. Although in this embodiment the additional connection comprises rigid rods, in other embodiments these can be of telescopic type.

Although in the particular embodiment described the ground-engaging members are wheels, it will be apparent that they can instead be tracks, such as the tracks 57 indicated by broken lines in FIGURE 1, each of which is carried and driven by the associated pair of the wheels 17, or by some other form of wheel. In some arrangements only one driving wheel or pair of wheels may be required for each unit, the other wheels not being driven. Other combinations of arrangements will be apparent to those skilled in the art.

It will be apparent that I have provided an exceptionally simple form of vehicle that is relatively inexpensive to manufacture and yet will be completely robust. Although the invention has been described in connection with a particular form of vehicle, it will be apparent to those skilled in the art that it is capable of wider application, such as tractors for use in orchards, that must be readily manoeuverable and yet provide good traction, but in which each unit has only two spaced wheels or tracks, or in which one unit has two spaced wheels or tracks while the other unit has only a single wheel or track. Modifications and variations within the scope of the claims will therefore be apparent to those skilled in the art.

What we claim is:

1. An articulated vehicle comprising at least two vehicle units, each vehicle unit comprising a pair of longitudinally spaced wheel and axle assemblies upon which the respective unit is mounted for movement over the ground, the axes of rotation of all the said assemblies being parallel to one another, a driving motor mounted in one unit, driving means drivably connecting the motor and at least one of the assemblies of the said one unit, a first rotatable member rotatably mounted in the said one unit, driving means drivably connecting the motor and the said first rotatable member, a second rotatable member rotatably mounted in the other unit, a universal joint having its principal rotational axis generally parallel to the axes of rotation of the said assemblies and connecting the said first and second rotatable members to drivably connect the two rotatable members together and to articulately connect the two units together for relative pitching motion about the said principal rotational axis, for relative pivoting motion about a vertical pivot axis, and for relative rolling motion about a horizontal axis, driving means drivably connecting the said rotatable member of the other unit and at least one of said assemblies of the other unit and means interconnecting the said two vehicle units to constrain the units against relative pivoting motion about the said vertical pivot axis of greater than a predetermined extent.

2. An articulated vehicle as claimed in claim 1, wherein the said interconnecting means comprise steering link means, first and second connections respectively on said one unit and said other unit and connecting the steering link means respectively thereto, a steering member, means mounting the steering member on one of the said units, and means connecting the steering member and the said steering link means to steer the vehicle by pivoting the two units relative to one another about the said vertical pivot axis of the universal joint.

3. An articulated vehicle as claimed in claim 2, wherein the said steering link means is longitudinally extensible, the said first connection on said one unit is fixed in position transversely thereof, the said second connection on said other unit is movable transversely thereof, the said steering member is mounted on the other unit, and the said means connecting the steering member and the second connection move the latter in response to movement of the steering member to steer the vehicle.

4. An articulated vehicle as claimed in claim 3, wherein said means for moving the said second connection comprise a rotatable member to which the connection is connected, means mounting the said rotatable member on the said other vehicle unit for rotation about an axis which is displaced from said connection, and means connecting the said rotatable member and the steering member for rotation of the rotatable member by the steering member whereby the connection moves with a simple harmonic motion in the respective direction away from its median position to produce corresponding variable rate steering of the vehicle.

5. An articulated vehicle as claimed in claim 1, wherein the said two vehicle units comprise elongated bodies of the same shape, each having a generally central longitudinal plane and both having at corresponding ends thereof a body extension extending to one side of said plane, the said first rotatable member is mounted in the extension of the said one unit body, the said second rotatable member is mounted in the extension of the said other unit body, the said extensions of the two bodies extend generally parallel to one another on opposite sides of the said plane, and the said universal joint is disposed between the said body extensions.

6. An articulated vehicle as claimed in claim 1, wherein each vehicle unit comprises two longitudinally spaced pairs of bearings mounted in each body, the two bearings of each pair being coaxial and transversely spaced relative to one another, a respective one of the said wheel and axle assemblies being rotatably mounted in each pair of bearings, an axle chain sprocket on each axle, a motor chain sprocket in said one unit drivably connected to the said motor, the axes of rotation of all said chain sprockets being parallel to one another, a first chain driving member in said one unit drivably connecting the said motor sprocket, both the respective axle sprockets and the respective rotatable member sprocket, and a second chain driving member in the other unit drivably connecting both the respective axle sprockets and the respective rotatable member sprocket.

7. An articulated vehicle as claimed in claim 1, and comprising an additional connection means for connection between the two vehicle units to restrain their freedom to pitch and roll relative to one another, said additional connection comprising respective strut means for each unit, means pivotally connecting each strut means to the respective unit body, and means pivotally connecting the said strut means to one another on the said vertical pivot axis of the universal joint.

8. An articulated vehicle as claimed in claim 1, wherein each vehicle unit comprises a pair of spaced ground-engaging members constituted by a transversely spaced pair of endless tracks, each of which tracks is carried by two corresponding wheels of the said longitudinally-spaced wheel and axle assemblies, one of which assemblies constitutes a driving assembly, the said driving means of said one unit drivably connects the driving assembly of said one unit to the driving motor, and the said driving means of the other unit drivably connects the driving assembly of the other unit to the said second rotatable member.

References Cited

UNITED STATES PATENTS

| | | | |
|---|---|---|---|
| 1,285,841 | 11/1918 | Rinker | 180—50 |
| 1,373,981 | 4/1921 | Smith | 180—50 |
| 1,433,742 | 10/1922 | Pyle | 180—77 |
| 1,434,389 | 11/1922 | Keltner | 180—77 |
| 2,303,180 | 11/1942 | Swenson | 180—14 |
| 3,215,219 | 11/1965 | Forsyth et al. | 180—14 |

BENJAMIN HERSH, *Primary Examiner.*

MILTON BUCHLER, *Examiner.*

C. C. PARSONS, *Assistant Examiner.*